United States Patent
Rausch et al.

(10) Patent No.: US 7,483,229 B2
(45) Date of Patent: Jan. 27, 2009

(54) OPTICAL COUPLING TO DATA RECORDING TRANSDUCER

(75) Inventors: Tim Rausch, Gibsonia, PA (US); Patrick Breckow Chu, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 356 days.

(21) Appl. No.: 11/007,959

(22) Filed: Dec. 8, 2004

(65) Prior Publication Data

US 2006/0119983 A1    Jun. 8, 2006

(51) Int. Cl.
    *G11B 5/02* (2006.01)
(52) U.S. Cl. .................. 360/59; 360/128; 369/13.12; 369/13.24; 369/13.32; 369/13.33
(58) Field of Classification Search .............. 360/294.1, 360/294.6, 294.2, 59; 369/13.13, 13.24, 369/13.32, 13.33, 13.17, 13.02
    See application file for complete search history.

(56) References Cited

U.S. PATENT DOCUMENTS

| | | | | |
|---|---|---|---|---|
| 5,193,082 A | * | 3/1993 | Miyake et al. | 369/13.13 |
| 5,986,978 A | * | 11/1999 | Rottmayer et al. | 369/13.17 |
| 6,016,290 A | * | 1/2000 | Chen et al. | 369/13.17 |
| 6,078,473 A | * | 6/2000 | Crane et al. | 360/294.3 |
| 6,081,499 A | | 6/2000 | Berger et al. | |
| 6,288,870 B1 | * | 9/2001 | Saliba | 360/121 |
| 6,414,911 B1 | | 7/2002 | Wilde et al. | |
| 6,535,474 B1 | | 3/2003 | Yee et al. | |
| 6,538,974 B2 | | 3/2003 | Wilde et al. | |
| 6,587,421 B1 | | 7/2003 | Wilde et al. | |
| 6,625,101 B1 | | 9/2003 | Jerman et al. | |
| 6,700,838 B1 | | 3/2004 | McDaniel | |
| 6,714,370 B2 | | 3/2004 | McDaniel et al. | |
| 6,721,237 B2 | * | 4/2004 | Kojima et al. | 369/13.13 |
| 6,762,977 B1 | * | 7/2004 | Gage et al. | 369/13.13 |
| 6,795,380 B2 | * | 9/2004 | Akiyama et al. | 369/13.33 |
| 7,095,587 B2 | * | 8/2006 | Kurita et al. | 360/128 |
| 7,310,206 B2 | * | 12/2007 | Liu et al. | 360/317 |
| 2001/0021076 A1 | * | 9/2001 | Kojima et al. | 360/59 |
| 2002/0003752 A1 | | 1/2002 | Fuji et al. | |
| 2002/0080690 A1 | | 6/2002 | Belser et al. | |
| 2002/0167870 A1 | | 11/2002 | Akiyama et al. | |
| 2003/0043699 A1 | * | 3/2003 | Isshiki et al. | 369/13.33 |
| 2003/0112542 A1 | * | 6/2003 | Rettner et al. | 360/59 |
| 2003/0123335 A1 | | 7/2003 | Rettner et al. | |
| 2003/0128633 A1 | | 7/2003 | Batra et al. | |
| 2003/0198146 A1 | | 10/2003 | Rottmayer et al. | |
| 2003/0235121 A1 | | 12/2003 | Eppler | |
| 2004/0001394 A1 | | 1/2004 | Challener et al. | |
| 2004/0001420 A1 | | 1/2004 | Challener | |

(Continued)

*Primary Examiner*—Andrea L Wellington
*Assistant Examiner*—Matthew G Kayrish
(74) *Attorney, Agent, or Firm*—Westman, Champlin & Kelly, P.A.

(57) ABSTRACT

In a recording transducer, radiant energy is incident to be coupled to a recording head via a path defined in the support (e.g., slider) for the head. The radiant energy may be directed via a fiber or lens (e.g., MEMS lens) through a channel defined in the slider. The slider may be keyed to accept the fiber or lens. The process for fabricating the channel in the slider the channel may include wafer level processing to form holes in the slider, to accept the fiber or lens. Wafer level MEM optical processing may be deployed to form integrated MEMS lens structures for an array of sliders.

20 Claims, 7 Drawing Sheets

U.S. PATENT DOCUMENTS

| | | |
|---|---|---|
| 2004/0008591 A1 | 1/2004 | Johns et al. |
| 2004/0062503 A1 | 4/2004 | Challener |
| 2004/0120064 A1* | 6/2004 | Dugas et al. ............... 360/59 |
| 2005/0071859 A1* | 3/2005 | Coehoorn et al. .......... 720/659 |
| 2005/0111309 A1* | 5/2005 | Peng ...................... 369/13.11 |
| 2005/0190496 A1* | 9/2005 | Hamann et al. ............ 360/128 |
| 2006/0143635 A1* | 6/2006 | Liu et al. ................... 720/659 |
| 2008/0049563 A1* | 2/2008 | Konno et al. ............ 369/13.24 |

* cited by examiner

OPTICAL COUPLING TO DATA RECORDING TRANSDUCER

This invention was made with United States Government support under Agreement No. 70NANB1H3056 awarded by the National Institute of Standards and Technology (NIST). The United States Government has certain rights in the invention.

FIELD OF THE INVENTION

The present invention relates to data recording transducers, and particularly to transducers for use in heat assisted data recording systems, and more particularly to the delivery of radiation to a recording head in a transducer.

BACKGROUND OF THE INVENTION

There are many different forms of data recording. For example, magnetic data recording is one of the prevailing forms of data recording. Magnetic data recording may be implemented using different types of magnetic recording media, including tapes, hard discs, floppy discs, etc. Over the years, significant developments have been made to increase the areal data recording density in magnetic data recording.

Superparamagnetism is a major limiting factor to increasing magnetic recording areal density. Superparamagnetism results from thermal excitations perturbing the magnetization of grains in a ferromagnetic material, making the magnetization unstable. As the magnetic media grain size is reduced for high areal density recording, superparamagnetic instabilities become more of an issue. The superparamagnetic effect is most evident when the grain volume V is sufficiently small that the inequality $K_u V/k_B T > 40$ can no longer be maintained. $K_u$ is the material's magnetic crystalline anisotropy energy density, $k_B$ is the Boltzmann's constant, and T is absolute temperature. When this inequality is not satisfied, thermal energy demagnetizes the individual grains and the stored data bits will not be stable. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, the available recording heads are not able to provide a sufficiently high enough magnetic writing field to write on such a medium. Heat Assisted Magnetic Recording (HAMR), sometimes referred to as optical or thermal assisted recording, has been proposed to overcome at least some of the problems associated with the superparamagnetic effect. HAMR generally refers to the concept of locally heating a recording medium with a laser to reduce the coercivity of the recording medium, so that an applied magnetic writing field can more easily direct the magnetization of the recording medium during the temporary magnetic softening of the recording medium caused by the laser. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information.

Figure 1A:
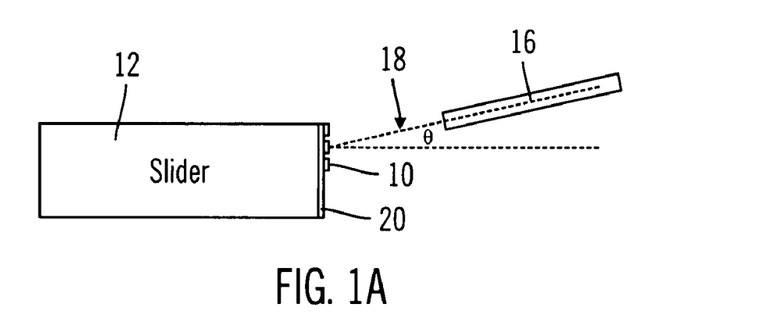
FIG. 1A is a schematic representation of a magnetic recording head supported on a slider in relation to an external optical fiber.
Figure 1B:
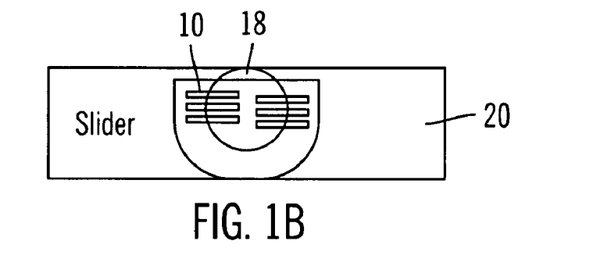
FIG. 1B is a front view of the diffraction grating on the head, illustrating the alignment of the optical spot from the fiber.

Current proposed HAMR head designs uses an optical fiber to couple the light from the laser to the recording head. The head integrates a waveguide for facilitating coupling the light from the laser onto the recording medium. Certain current HAMR head designs require that the head, which is supported at one end of a slider, to have a sufficiently large back surface area in order to accommodate coupling of the light from the laser, which competes for space with the bonding pads (not shown) for external electrical leads to the head. Further, precise alignment of the fiber to the head is required. For example, as shown in FIGS. 1A and 1B, one current design of HAMR head 20 uses a diffraction grating 10 on the back of the slider 12 to couple light into a waveguide 14 in the slider. The grating 10 is exposed to external of the HAMR head 20. In order for this design to work, the angle of the fiber 16 with respect to the normal of the grating 10 has to be precisely maintained at the designed angle. The head can further include a solid immersion mirror (SIM) (not shown) for focusing radiant energy. In order for proper coupling with the grating 10, and proper focusing within the SIM, the beam 18 from the fiber 16 has to be precisely centered on the grating, and at the designed angle θ. Therefore, during the assembly of the slider to the suspension assembly, the fiber and the head will have to be aligned to very exact tolerances. Further, the fiber and the head must maintain these tolerances during the lifetime of the drive.

Accordingly, there is a need for a support for precise coupling of radiant energy from a fiber to a HAMR head. It is also desirable that this support minimizes coverage of the surface area on the back of the slider to make room available for bonding pads.

SUMMARY OF THE INVENTION

The present invention is directed to precise coupling of radiant energy to a data recording head in a transducer. The radiant energy is incident to be coupled to the head via a path defined in the support for the head. The path may include a radiation transmission element for radiant energy. In a particular embodiment, the data recording head is of the type designed and structured for magnetic data recording in magnetic disc storage systems.

In one aspect of the present invention, the head is supported by a slider, and the radiant energy is directed via a fiber as the radiation transmission element through the channel defined in the slider. In one embodiment, a waveguide is provided within the head, between the write head film structure and the fiber. A diffraction grating is coupled to the waveguide, on the side between the fiber in the slider and the waveguide. The radiant energy from the fiber is incident at the waveguide, from the slider side. A transparent layer base may be provided between the head and the slider substrate, or alternatively, the slider could be fabricated from a transparent material. In another embodiment of the present invention, the radiant energy is directed via an optical element (e.g., a lens assembly, such as a micro-electromechanical systems (MEMS) integrated optical structure) as the radiation transmission element.

In another aspect of the present invention, a process is disclosed for fabricating the channel in the slider, to address both the angle tolerance and position tolerance of fiber with respect to the grating. In one embodiment of the process, the channel (e.g., having a rectangular cross-section) in the slider can be keyed to accept a fiber, to precisely position the fiber in both the horizontal and vertical direction. In another embodiment, wafer level processing may be deployed to form holes in the slider, to accept an optical element. Wafer level MEM optical processing may be deployed to form integrated MEMS lens structures for an array of sliders.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

The present invention is directed to precise coupling of radiant energy to a data recording head. A recording head, as used herein, is generally defined as a head capable of performing read and/or write operations. By way of illustration and not limitation, the present invention will be described in connection with a magnetic data recording head and system, and in particular a HAMR head and system in which both data writing and reading are effected by magnetic induction.

Figure 2:
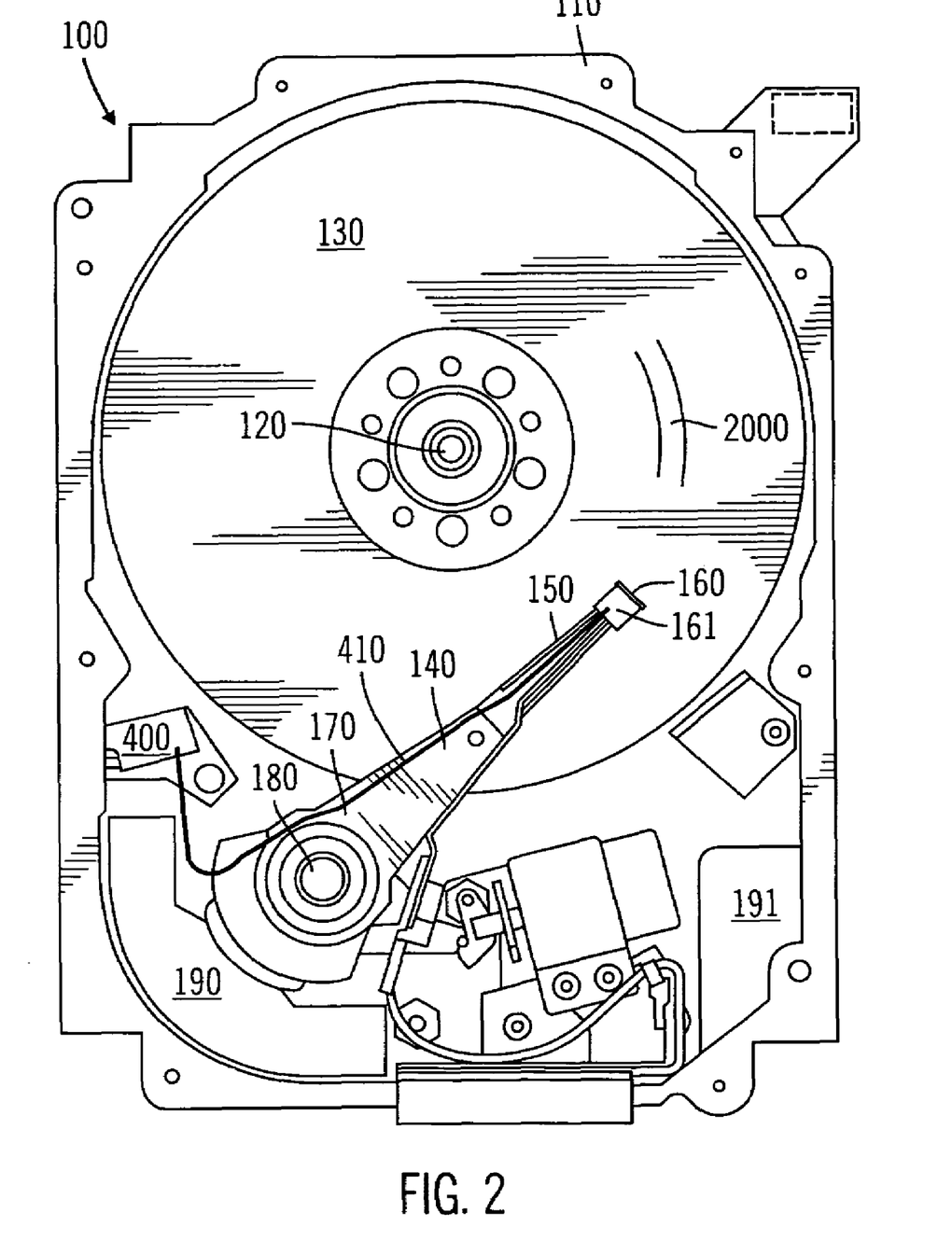
FIG. 2 is a pictorial representation of a magnetic disc drive that incorporates the inventive optical coupling to the HAMR head, in accordance with one embodiment of the present invention.

FIG. 2 is a pictorial representation of a magnetic disc drive 100 that incorporates the inventive optical coupling to the HAMR head, in accordance with one embodiment of the present invention. The disc drive 100 includes a housing 110 (with the upper portion removed and the lower portion visible in this view) sized and configured to contain the various components of the disc drive 100. The disc drive 100 includes a spindle motor 120 for rotating at least one perpendicular magnetic storage medium 130 within the housing 110. At least one arm 140 is contained within the housing 110, with the arm 140 having a first end 150 with a perpendicular recording head 160 supported on a slider 161, and a second end 170 pivotally mounted on a shaft by a bearing 180. The slider 161 has an air-bearing surface (typically patterned with certain surface features) facing the medium 130. The aerodynamic interactions between the slider air-bearing surface and the medium 130 creates an air gap or an air bearing against the medium 130. An actuator motor 190 (e.g., a voice-coil motor) is located at the arm's second end 170 for pivoting the arm 140 to position the recording head 160 over a desired sector or track 2000 of the disc 130. The actuator motor 190 is regulated by a controller 191.

The disc drive 100 includes a source of radiant energy 400 and an optical fiber 410. The source 400 provides for the generation of surface plasmons or guided modes that travel toward a heat emission surface 435 that is formed along the air-bearing surface 355 thereof. The source 400 may be, for example, a laser diode, or other suitable lasers or coherent light source with sufficient radiant energy. The radiant energy can be in the form of, for example, visible light, infrared light, or other visible or invisible light in other frequency or wavelength spectrums. The optical fiber 410 facilitates transmission of the radiant energy from the source 400 to the recording head 160. The source 400 may be located within or external to the housing 110. The optical fiber 410 may be routed from the source 400 along the suspension arm 140, and coupled via the slider 161 to the recording head 160 (the combination of the slider and head is generally referred to as a transducer). In one embodiment as discussed below, the fiber 410 is supported in a channel defined in the slider 161, optically coupling to the head 160. In another embodiment as discussed below, the fiber 410 is optically coupled to an optical element supported by the slider 161 (e.g., in a channel defined in the slider).

Figure 3:
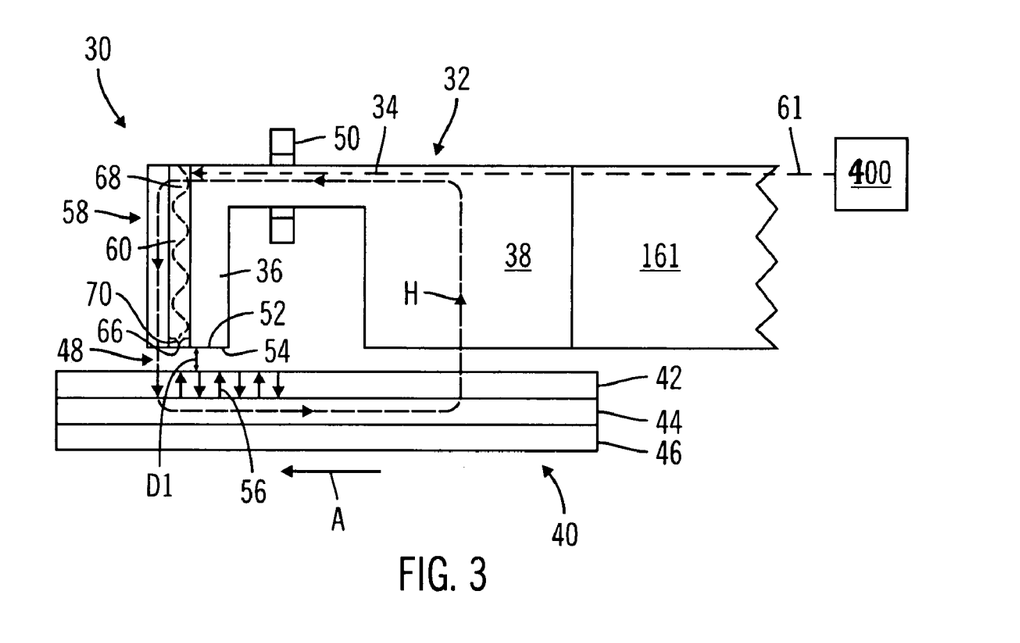
FIG. 3 is a partial schematic side view of a perpendicular magnetic recording head in accordance with one embodiment of the present invention.

While source 400 is illustrated in FIG. 3 to be coupled to the slider 161 by the optical fiber 410, it may be made a part of the slider 161. For example, a solid-state laser may be a part attached to a side of the slider 161 away from the head 160, in a manner to provide optical coupling of the radiant energy to the head 160 for HAMR. Alternatively, radiant energy may be end fire coupled or prism coupled to the optical element supported by the slider 161.

The controller 191, possibly in conjunction with control signals from an external information processing system, not shown, controls the operations and synchronizations of the various components of the disc drive 100, including the radiant energy source 400, in connection with data write operations.

The present invention is described herein below in reference to perpendicular magnetic recording, in accordance with one embodiment. However, it will be appreciated that aspects of the invention may also be used in conjunction with other types of recording (e.g., longitudinal media, tilted media, or patterned media) where it may be desirable to employ heat-assisted magnetic recording. This present invention may also be used in conjunction with phase change media using optical or other methods of data readback.

Referring to FIG. 3, which is a partially schematic side view of one embodiment of a perpendicular magnetic recording head 30 (which may be substituted as the recording head 160 in FIG. 2), it is instructive to first discuss the general operation of a perpendicular recording HAMR system. FIG. 3 also shows the magnetic recording medium 40 that is suitable for perpendicular magnetic recording. Perpendicular magnetic recording, as used herein, generally refers to orienting magnetic domains within a magnetic storage medium substantially perpendicular to the direction of travel of the recording head 30 and/or recording medium 40.

The recording head 30 may comprise a thin film structure, constructed using known processes including deposition, lithographic and etching steps. The recording head 30 includes a magnetic write head 32, which includes a yoke 34 that forms a write pole 36 and a return pole 38. The recording head 30 is positioned adjacent to a perpendicular magnetic storage medium 40 having a magnetically hard layer 42 and a magnetically soft layer 44 supported by a substrate 46. An air bearing 48 separates the recording head from the storage medium by a distance D1. A coil 50 is used to control the magnetization of the yoke to produce a write field at an end 52 of the write pole adjacent to an air bearing surface 54 of the write head. The recording head 30 can also include a magnetic read head, not shown in FIG. 3, which may be any conventional type magnetic read head as is generally known in the art (i.e., the type that senses changes in electrical signal induced by magnetic data). In the embodiment of the HAMR system shown in FIG. 3, the read head is not an optical read head that senses the influence of magnetization on an optical signal, as is found in a magneto-optical recording system.

The perpendicular magnetic storage medium 40 is positioned adjacent to or under the recording head 30 and travels in the direction of arrow A. The recording medium 40 includes a substrate 46, which may be made of any suitable material such as ceramic glass or amorphous glass. A soft magnetic underlayer 44 is deposited on the substrate 46. The soft magnetic underlayer 44 may be made of any suitable material such as, for example, alloys or multilayers having Co, Fe, Ni, Pd, Pt or Ru. A hard magnetic recording layer 42 is deposited on the soft underlayer 44, with the perpendicular oriented magnetic domains 56 contained in the hard layer 42. Suitable hard magnetic materials for the hard magnetic recording layer 42 may include at least one material selected from, for example, FePt or CoCrPt alloys having a relatively high anisotropy at ambient temperature.

The recording head 30 also includes means for heating the magnetic storage medium 40 proximate to where the write pole 36 applies the magnetic write field H to the storage medium 40. Specifically, the means for heating includes an optical waveguide 58 which may be formed by a transparent layer 60. The optical waveguide 58 receives a source of radiant energy (schematically represented by dotted line 61) from the source 400 (see also FIG. 2). The radiant energy 61 can be, for example, visible light, infrared or ultra violet radiation, coupled to the waveguide 58 in accordance with the present invention. The source 400 provides for the generation of surface plasmons or guided modes that travel through the optical waveguide 58 toward a heat emission surface 66 that is formed along the air-bearing surface thereof. The transmitted radiant energy, generally designated by reference number 68, passes from the heat emission surface 66 of the optical waveguide 58 to the surface of the storage medium for heating a localized area of the storage medium 40, and particularly for heating a localized area of the hard magnetic layer 42. The waveguide 58 includes a near-field coupling structure 70 (schematically shown) for confining the radiant energy to the recording spot.

At the surface of the medium 40, the surface plasmons convert a portion of their energy into heat in the medium 40. The transparent layer 60 may be formed, for example, from a silica based material, such as $SiO_2$. The transparent layer 60 should be a non-conductive dielectric, and have extremely low optical absorption (high transmissivity). It will be appreciated that in addition to the transparent layer 60, the waveguide 58 may include an optional cladding layer, such as aluminum, positioned adjacent the transparent layer 60 or an optional overcoat layer, such as an alumina oxide, for protecting the waveguide 58.

At a downtrack location, when the medium 40 is moved to position the heated spot under the write pole 36, the write pole 36 applies a magnetic write field H to the heated spot, corresponding to write data. The write field H is applied while the spot remains at a sufficiently high temperature for lowering the coercivity of the recording medium 130. The write pole 36 has a relatively high saturation magnetic moment, thereby resulting in a strong magnetic write field H. The strong magnetic write field H permits use of the recording medium 40 having a relatively high coercivity or anisotropy, thereby limiting superparamagnetic instabilities even at high recording densities.

The coupling of the radiant energy to the waveguide is now described in reference to various embodiments below, in reference to FIGS. 4 to 7. The present invention is compatible with prism coupling and end fire coupling. End fire coupling is a term often used to refer to the incident of radiant energy directly to an exposed end of a waveguide. In one embodiment, the radiant energy may be delivered to the head by an optical fiber supported on the slider. In another embodiment, the radiant energy may be delivered to the head by an optical fiber optically coupled to the slider.

Figure 4A:
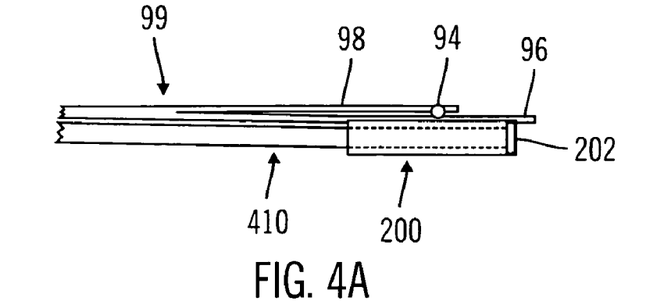
FIG. 4A is a side view of a head suspension assembly including the optical coupling in accordance with one embodiment of the present invention.
Figure 4B:
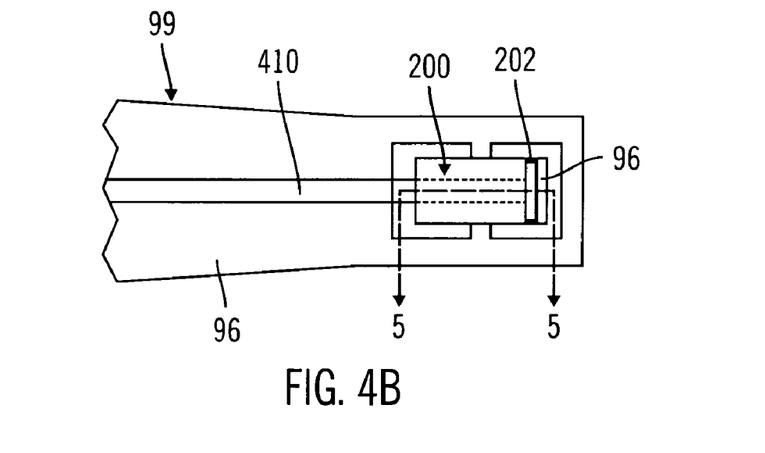
FIG. 4B is a bottom view of the structure shown in FIG. 4A.
Figure 5:
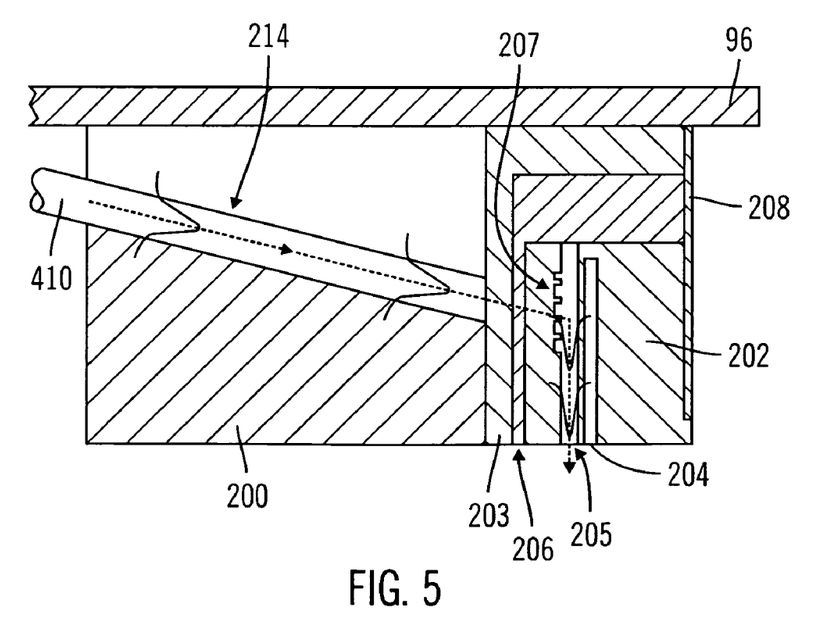
FIG. 5 is a schematic sectional view taken along line 5-5 in FIG. 4B.

FIGS. 4A, 4B and 5 schematically illustrate that embodiment in which the optical fiber 410 is physically coupled to or supported by the slider 200 (which may be equivalent to the slider 161 in FIG. 3). Specifically, the recording head 202 (which may be equivalent to the recording head 160 in FIG. 2 and/or perpendicular recording head 30 in FIG. 3) is supported by the slider 200, to form a transducer, and the radiant energy is directed via an optical fiber 410 through a channel 214 defined in the slider 200. FIGS. 4A and 4B illustrates the slider 200 supported on a head suspension assembly 99 (which may be equivalent to the arm 140 in FIG. 2). The head suspension assembly 99 may comprise a load beam 98 supporting a flexure 96 to which the slider 200 is mounted and which permits pitch and roll movements of the slider 200 to follow disk surface fluctuations. The section (not shown in FIGS. 4A and 4B) of the fiber 410 away from the slider 200 is attached to the load beam 98 to reduce windage during spinning of the recording medium.

Many types of flexures have been developed including flexures that are integrated into the design of the load beam and those formed as a separate element and fixed to the load beam. FIGS. 4A and 4B illustrates the embodiment in which the load beam 98 includes a dimple 94 that interacts with the flexure 96 to provide a point load to the flexure 96 about which pitch and roll movements can occur. The flexure 96 includes at least a cantilever portion having a free end, which is resiliently movable relative to the remainder of the flexure, allowing gimballing of the slider/head combination. In another type of suspension assembly, the gimbal is integrated into the flexure. A pivot point such as a dimple is not relied upon for gimballing. An integrated or built-in gimbal structure comprising connecting portions or bridges that structurally couple a slider mounting base of the flexure to the load beam, defines axes of pitch and roll, and movements in other directions. This type of suspension is sometimes referred to as integrated gimbal suspension.

It is appreciated that the slider and the recording head may be fabricated on a single substrate or fabricated as separate components assembled together. It is also appreciated that the suspension assembly, flexure and/or slider may include other or additional static and/or dynamic components that facilitate tracking of the slider and/or recording head with respect to the recording medium, without departing from the scope and spirit of the present invention.

As would be appreciated by one skilled in the art, the slider suspension, including the flexure, is a delicate structure of which the precise mechanical requirements can be easily disturbed by stresses from external elements. According to the present invention, the coupling of the radiant energy to the slider is structured to introduce minimum stress to the suspension components.

FIG. 5 is a schematic side sectional view of the slider 200 supporting the recording head 202, and the coupling of the optical fiber 410 to the slider in accordance with one embodiment of the present invention. In this embodiment, the recording head 202 is designed for heat-assisted perpendicular recording. The head 202 is attached to the trailing end (with respect to the direction of motion A of the recording medium 40 shown in FIG. 3) of the slider 200. The head includes a write pole 204, a read pole 206, a waveguide 205 between the read pole 206 and the write pole 204, and a grating 207 functionally coupled to the waveguide 205. The grating 207 and the waveguide 205 are not exposed to external of the data recording head 202. One or more of the grating 207, write pole 204, read pole 206, and waveguide 205 may have a thin film structure, such as constructed by thin film processes known in the art. Contact pads 208 for external electrical connections are provided at the external surface of the head 202 or the back of the slider 200. The tip of fiber 410 may include an integrated or separate micro-lens structure (not shown). While the tip of fiber 410 is shown to be a surface at an angle to the fiber axis, the tip may be orthogonal to the fiber axis. The tip may be treated with an anti-reflective coating to reduce internal reflections at the end of the fiber. A person skilled in the optics art would appreciate further refinements to facilitate light transmission from the fiber 410 to the grating 207. In the embodiment shown in FIG. 5, light may diffract at the angled tip surface to the grating 207. The grating 207 is designed to couple with light incident at the particular angle or range of angles on the grating 207.

As shown in FIG. 5, the light from the fiber 410 is incident at the grating 207 from the back of the waveguide 205 (when viewed from the side external of the head 202). Therefore the channel of the waveguide 205 is positioned to the back of the write pole as shown in FIG. 5. Further, a transparent base 203 is deposited between the reader 206 and the slider 200. Alternately or in addition, the slider 200 could be fabricated partially or entirely from a transparent material. Since the light is incident from the back end in this embodiment, the grating 207 is fabricated between the slider 200 and the waveguide 205. In prior art structures in which the external radiant energy is delivered to the grating at the trailing end of the slider using a fiber not supported by the slider, it would be necessary to allow for an optical path through the contact pads so the light from the fiber is not blocked by the contact pads. With the inventive structure, since the grating 207 is not on the trailing end of the slider, and therefore does not need to share the space with the bonding pads 208, the grating 207 can be made much larger and therefore much more efficient in optical coupling.

The structure of the read pole 206, write pole 204, waveguide 205, etc. and the process for making of such may be conventional, similar to those known in the existing art. Additional structural details of the perpendicular HAMR head 202 are omitted from the simplified view in FIG. 5, but such are similar to those shown in FIG. 3.

In this embodiment, an open, recessed channel 214 (e.g., 200μm wide; 100μm deep; 1000μm long) is formed in the body of the slider 200 and the fiber 410 is placed in the channel 214 within the slider 200. As noted above, external stresses can disturb the mechanical properties of the suspension assembly. According to the present invention, the fiber 410 can be mounted with negligible bend, and is therefore at a low stress mode. In other words, the fiber 410 that is unstressed would introduce minimum static stress to the suspension assembly as a result of the physical coupling to the slider. In addition, the mechanical characteristics of the fiber 410 in this mode may be modeled as an added support structure to the load beam and the gimbal and its effects can be described and modeled within the context of suspension design. By optimizing the design of the whole head gimbal assembly (HGA) with the fiber, the desired gimbal stiffness, spring rate, and resonance responses can be obtained.

The present inventive design also addresses both the angle tolerance and position tolerance issues. The channel 214 in the slider 200 can be keyed to accept a polished fiber 410 including a complementarily keyed structure. For example, using the same techniques used in the fabrication of the air bearing sliders (e.g., involving lithography and etching by ion milling), a rectangular channel 214 can be formed in the top of the slider 200. The fiber 410 can also be polished into a rectangle (or a section with a rectangular cross-section) that would just fit into the channel 214 in the slider 200. Therefore it is possible to precisely position the fiber in both the horizontal and vertical direction, with respect to the grating 207. If the fiber 410 is then bonded to the slider 200, the position should be maintained for the life of the drive. In principle it is possible to asymmetrically polish the terminating tip of the fiber 410 as shown in FIG. 5. This allows for the angle of the fiber 410 with respect to the normal of the grating 207 to be precisely controlled as well. Thus by keying the slider 200 and fiber 410 it is possible to control all three critical alignment tolerances.

As would be appreciated by one skilled in the art, the slider suspension including the flexure is a delicate structure of which the precise mechanical requirements can be easily disturbed by stresses from external elements. Although this is true if a fiber under stress is bonded to the suspension, the problem is more manageable if the fiber is bonded to the slider in a low stress mode.

While the foregoing embodiment discloses an open, recessed channel 214, it is contemplated that a closed channel may be provided instead, for example by filling the recessed channel 214 with a filler after the fiber 410 has been installed, or by forming a hole through the slider body (e.g., by laser or chemical etching), through which the fiber 410 may be inserted. The hole may be keyed to the fiber to facilitate alignment of the fiber to the slider.

Concerning fabrication of the slider, heretofore know in the art, sliders are formed by way of wafer processing. Magnetic recording heads are form on the slider substrate, for example by thin film processing, to form a transducer assembly. In the final processing steps of slider fabrication heretofore known in the art, the wafer of sliders are diced into bars (e.g., 46 sliders per bar) and mounted to a carrier (e.g., 24 bars per carrier), exposing the side of the bar corresponding to the air-bearing surface. Air-bearing surface features are patterned on the exposed surface of the bar/slider. For example, photoresist is used to mask the slider and ion milling is used to etch/create the air-bearing surface features. The bars (still mounted on the carrier) are then diced into individual sliders. The carrier then is dipped into hot acetone to release the sliders from the carrier. The individual sliders are then cleaned, amp-tested and sorted, and they are ready to be assembled on head suspension assembly.

In accordance with one embodiment of the present invention, the process for forming the channel 214 in the slider 200 may include masking and ion milling etching processes. In order to create the recess channel 214 in the slider for the fiber, one method is to release the bars from the carrier before slider dicing. The bars are then flipped and mounted onto a new carrier (e.g., by epoxy) with the air bearing surface side attached to the carrier. A lithographic process involving photoresist, patterning using a mask, and etching (e.g., ion milling) may be deployed to form the channel 214. The bar is then diced into individual sliders and the sliders are released from the carrier.

In view that the bar/slider contact surface to the carrier is reduced substantially to the protruding pattern of the air-bearing surface features, care must be taken to ensure sufficient security or robustness of the bond to the carrier. This can be achieved by using the right viscosity and stickiness of gluing material (photoresist, epoxy, etc.). This material used however must be fully removable and not cause any damage to the air-bearing surface features. Cooling during ion milling of the channel must be sufficiently provided by the carrier in view that the contact surface to the carrier is reduced to only the protruding air-bearing surface features and a relatively large volume of material to be removed by ion milling to form the channel. By reducing the ion milling etch rate, overheating of the slider components can be avoided.

Figure 8:
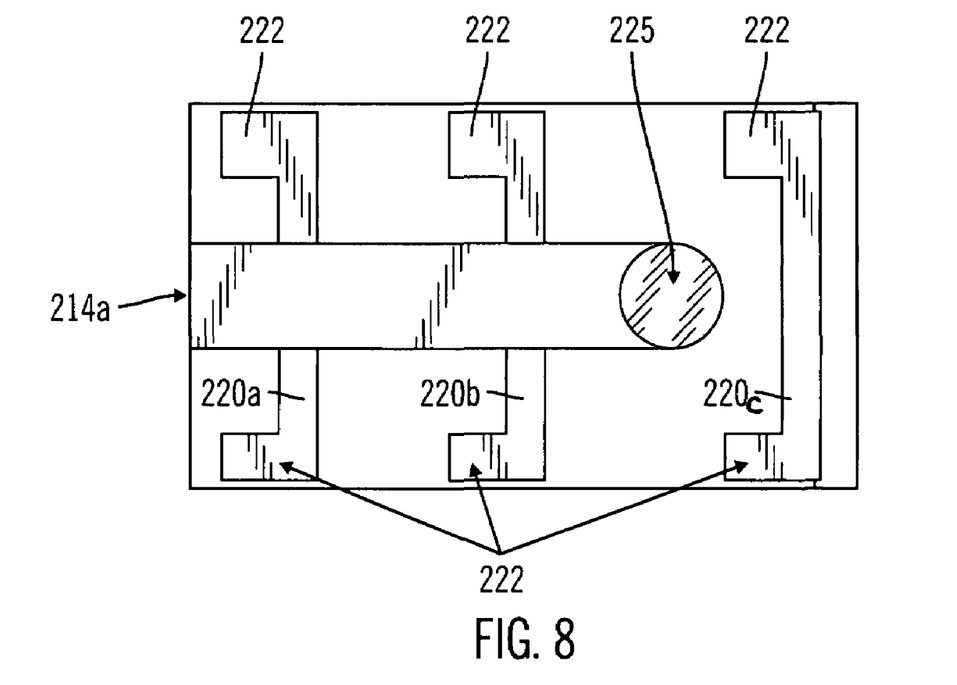
FIG. 8 is a top view of a slider illustrating the milling of a channel in accordance with one embodiment of the present invention.

The channel 214 could also be formed by other approaches. One such approach is to physically mill a channel (e.g., 30 μm wide) in the top of the slider 200. Machines exist which can perform this milling to the desired tolerances. For example, a commercially available milling system including milling tool may be from Mikrotools Pte Ltd. in Singapore (www.mikrotools.com). To use this approach, a transparent sacrificial layer 203 of a few or few ten microns may be deposited between the slider 200 and the head 202 as shown in FIG. 5, to provide a buffer zone to accommodate tolerances in the milling process, to prevent the milling tool from damaging the head 202. Referring to FIG. 8, on the top of the slider 200, several thin film wires 220a, 220b and 220c, each with contact pads 222, are laid down as shown. As the milling tool 225 works across the slider 200, the wires 220a and 220b are broken and a resistance change along such wires is measured. When the milling process reaches the last wire 220c, once the resistance being monitored shows the desired resistance reached, milling is stopped. In this particular embodiment shown in FIG. 8, a channel 214a in the slider is obtained with a rounded end, which may match a rounded end of a ball lens that may be provided at the end of the fiber 410.

Several considerations should be taken for the effect of the fiber on the slider. One end of the fiber is firmed attached to the slider. A section of the fiber is attached to the suspension load beam (not shown). Yet another section is freely suspended. The desired length of the free section is dependent on the targeted net pitch and roll stiffness to be achieved for the slider. As mentioned above, it is believed that the fiber that has negligible pre-bend from assembly does not introduce significant static stresses to the slider suspension assembly. Unfortunately, since the fiber is in physical contact with the slider, it is inevitable that vibration of the suspension and fiber will be coupled to the slider. However, the presence of the fiber (if it is stiffly glued to the suspension) may increase the stiffness of the suspension (sway and bending modes), which is a potential benefit in reducing the amplitude of the vibrations. A more loosely restrained fiber especially near the free portion of the fiber would reduce the direct coupling between the suspension and the slider, but the fiber itself might generate vibration of its own due to windage. Further, the fiber attached to the slider may interfere with the dynamic operation of the gimbal, both in the pitch and roll axes. This could theoretically not be a problem as along as the gimbal designs for both axes take into consideration for the restoring torques that the fiber may exert on the slider. Accordingly, the attachment scheme to attach the fiber to the suspension, such as location for glue placement and glue selection, and the gimbal design should be determined by taking into consideration of all the typical HGA criteria (gimbal stiffness, spring rate, and resonance responses) and additional vibration coupling effect due to the fiber.

Referring to the embodiment of the slider assembly shown in FIG. 5, Typically laser marks are put on the top side (the crown; the side opposite to the air-bearing surface) of the slider to "correct" or modify the crown after slider amp-testing/sorting before being attached to a head suspension assembly 99. With a channel 214 etched on the top of the slider 200, the crown correction opportunity may be affected. Accordingly, the slider fabrication should take into consideration such that the crown of the slider produces the target design point after attachment to the head suspension assembly and fiber attachment.

To complete the slider and suspension assembly combination, one possible assembly sequence is first to attach the fiber 410 to the slider 200, then slider 200 to the suspension assembly flexure 96, then fiber 410 to the flexure 96 and/or the load beam 98. Another approach is first to attach the fiber 410 to the flexure 96, the slider 200 to the flexure 96, then the fiber 410 to the slider 200. Alternatively, the fiber 410 is attached to the flexure 96, then the fiber 410 to the slider 200, then the slider 200 to the flexure 96. The benefit of the first approach is that the tip of fiber is referenced to the slider while the rest of the fiber is being glued such that critical placement tolerances of the fiber to the slider and the slider to the flexure can be achieved without the need to bend or twist the fiber.

Figure 6A:
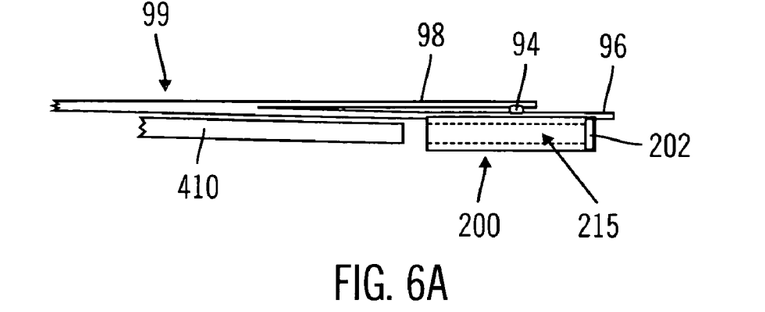
FIG. 6A is a side view of a head suspension assembly including the optical coupling in accordance with another embodiment of the present invention.
Figure 6B:
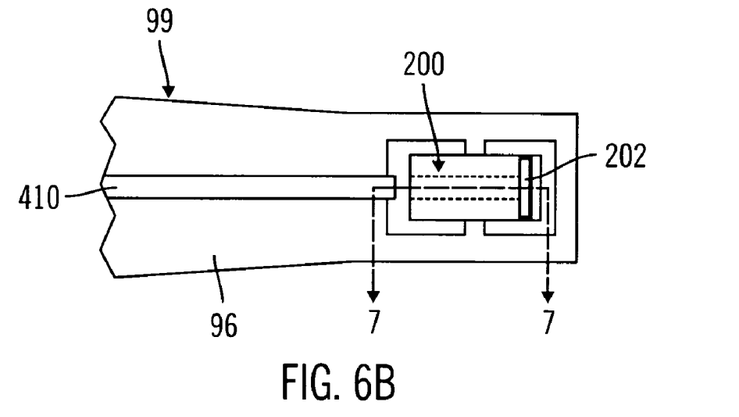
FIG. 6B is a bottom view of the structure shown in FIG. 6A.
Figure 7:
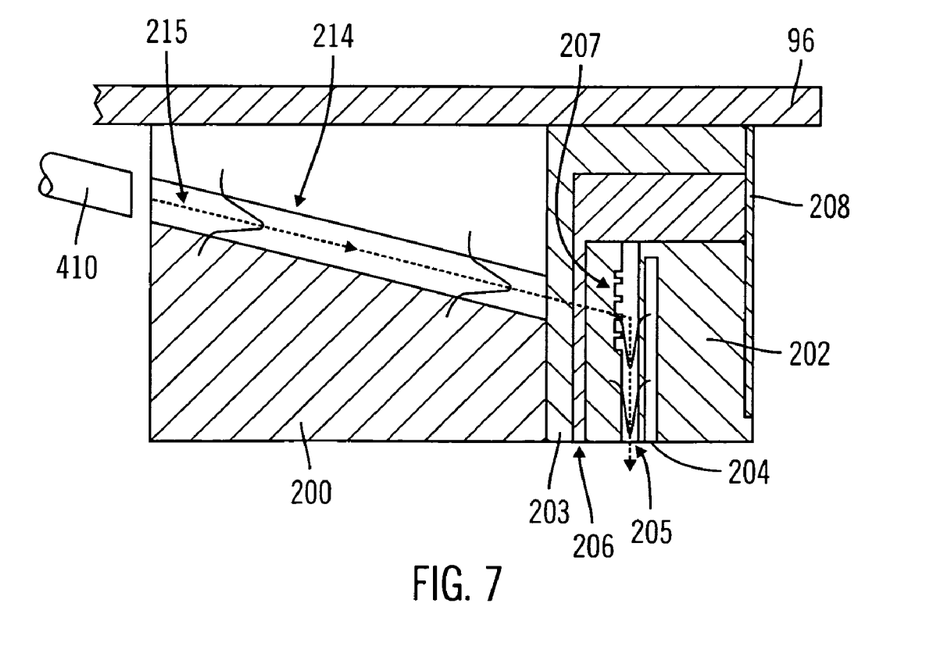
FIG. 7 is a schematic sectional view taken along line 7-7 in FIG. 6B.

FIGS. 6A, 6B and 7 illustrates another embodiment of the present invention in which the fiber 410 is not supported on the slider 200 as in the previous embodiment, but the terminating end of the fiber 410 is optically coupled to the waveguide in the head 202 through a coupling structure 215, which is supported in the channel 214 in the slider 200. In the embodiment of the invention shown in FIGS. 6A, 6B and 7, the fiber 410 is not in physical contact with the slider 200. The fiber 200 is simply mounted to the suspension assembly 99 and directed at the coupling structure 215 on the slider 200. The coupling structure 215 directs the energy beam onto the grating 207 and provides any necessary corrections that the beam requires. For example, the coupling structure 215 in the channel 214 may include an active or passive light transmitting component, such as a length of optical fiber or an optical element that optically couples radiant energy from the fiber to the waveguide 205, which may include a grating 207. The other parts of the slider 200 and head 202 are similar to the previous embodiment described above. In one embodiment, the optical element may include a lens assembly, such as a micro-electromechanical systems (MEMS) optical lens. The MEMS optical lens may be a separate lens structure received in the channel 214 in the slider 200. In another embodiment, the MEMS optical lens may be an integrated structure to the slider 200.

Figure 9:
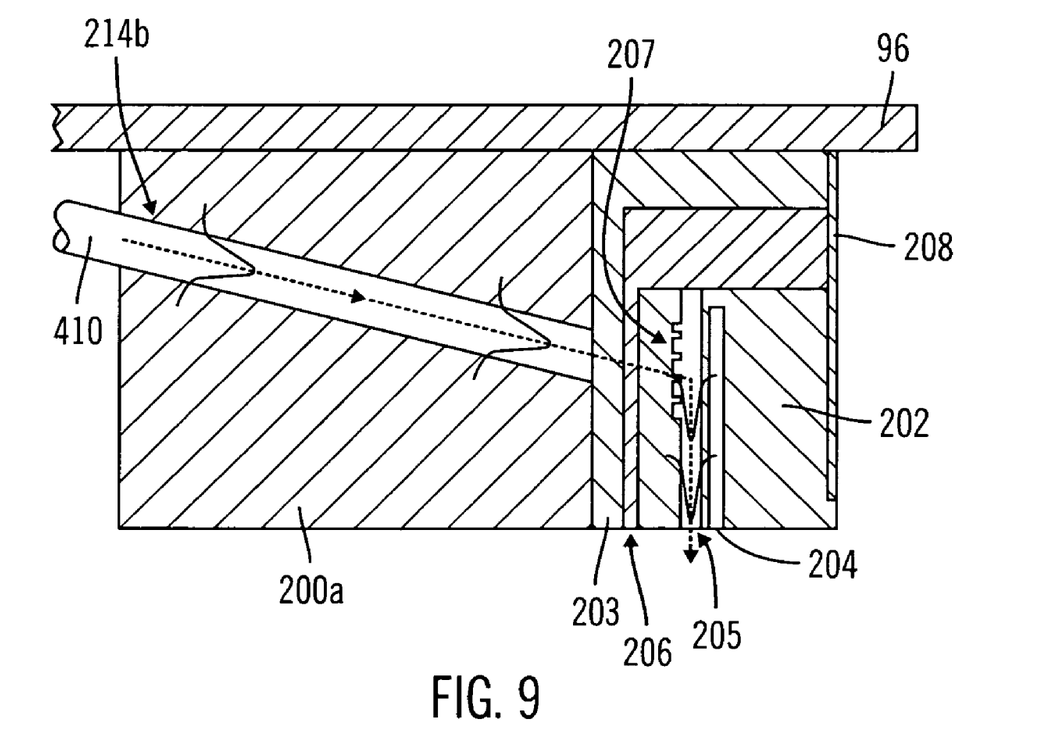
FIG. 9 is a schematic sectional view of a slider and fiber coupling in accordance with another embodiment of the present invention.

Referring FIG. 9, instead of an open, recessed channel in the slider as in the earlier embodiments, a closed channel 214b in the form of a hole may be provided in the slider 200a which receives a fiber 410. In an alternate embodiment (not shown), instead of inserting a fiber into the closed channel 214b in the slider 200a, a MEMS lens is inserted, such that the channels 214a are each provided with a coupling structure for coupling external radiation from an unattached fiber, similar to the earlier embodiment shown in FIG. 7. Further, the channel may be partially open and partially closed along the length of the channel, without departing from the scope and spirit of the present invention.

Such hole-channel approach is a wafer substrate level option. That is, the holes can be formed on the wafer prior to processing to form the slider and recording head or prior to dicing the wafer into bars. For example, in one embodiment in reference to FIG. 10, for an AlTiC wafer substrate 217, using the same milling technology as above, an array of 30 μm holes 219 are milled into the AlTiC substrate, each hole corresponding to a channel 214a in one slider 200a. The channels 214a may be through holes. Optical fibers 410 are then slid through the holes and bonded in place. The wafer 217 would have fibers pig tailed to the wafer. The surface of the wafer 217 with the fibers exposed is then polished smooth. After polishing, a smooth flat surface is provided for head fabrication, with the underlying substrate having the light delivery structure integrated into the substrate. Head fabrication proceeds as normal using this wafer 217.

Figure 10:
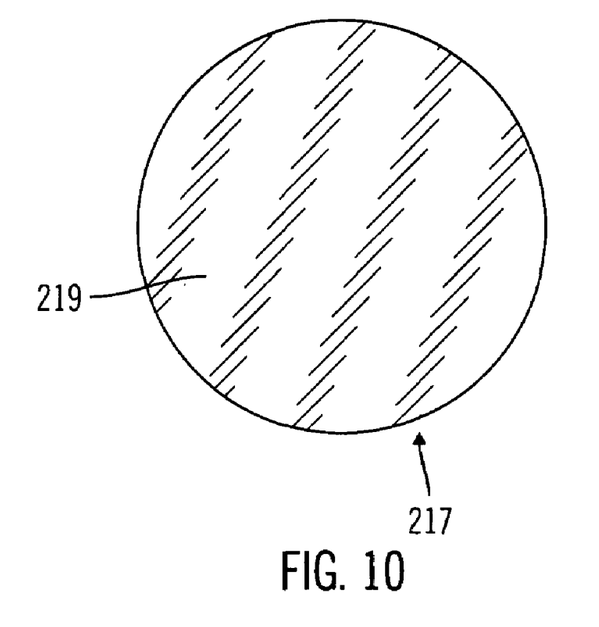
FIG. 10 is a schematic top view of a wafer illustrating wafer level processing of the channels in the slider.

In an alternate embodiment, instead of inserting a fiber into the holes in the wafer 217, an active or passive light transmission element is provided in the holes in the wafer 217, such as MEMS lenses, such that the channels 214a are each provided with a coupling structure for coupling external radiation from an unattached fiber.

In an alternate embodiment of the present invention, instead of inserting MEMS lenses into holes 219 provided in the wafer 217, wafer level MEMS optical processing is employed to process both sides of a glass substrate to form complicated lens structures. By way of wafer level MEMS processing, a large number of tiny lenses (e.g., thousands of lenses each 50 μm by 50 μm by 800 μm long) may be produced in a glass substrate using known processing methods. Sliders and recording heads may then be formed using the glass substrate, similar to earlier embodiments.

The optical assembly of the present invention can be well adapted to systems incorporating a microactuator for micropositioning of the magnetic recording head with respect to the flexure, in collaboration with the voice-coil actuator for relatively coarse positioning of the flexure. Various designs of microactuator assembly for disk drive recording applications had been developed in the art. The microactuator design standing alone is beyond the scope of the present invention. It is suffice to discuss the embodiments below to illustrate the relationship of the optical system of the present invention in a microactuated recording head assembly.

Figure 11:
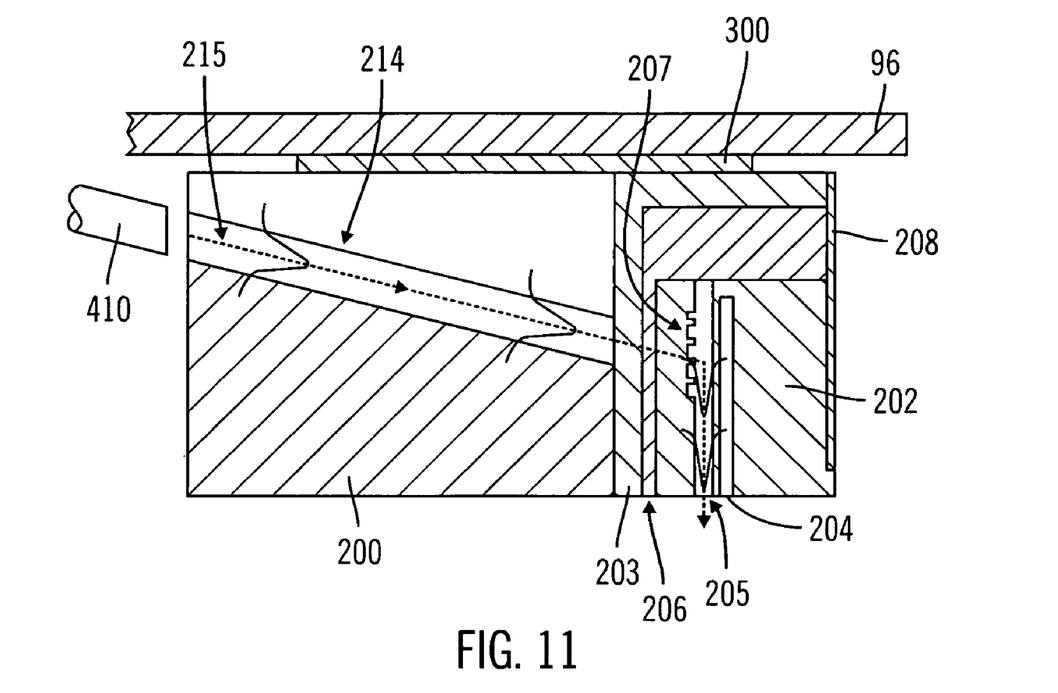
FIG. 11 is a schematic sectional view of a transducer supported by an actuator in accordance with one embodiment of the present invention.

FIG. 11 is a schematic sectional view illustrating the embodiment in which a transducer assembly is supported for motion with respect to the flexure 96, using an actuator 300 provided on the flexure 96. Comparing to the embodiment shown in FIG. 7, the difference in FIG. 11 is the addition of the actuator 300. The slider 200 and the actuator 300 may be fabricated as an integrated component (e.g., on a single substrate), or as separate components that are assembled together. The actuator 300 may be of the type that provides vertical motions as well as lateral cross track motions (with respect to the magnetic recording medium, e.g., medium 40 shown in FIG. 3). It is noted that the range of micropositioning by the actuator 300 may have to be limited to within the alignment tolerance between the fiber 410 and the optical coupling structure 215 in the slider 200. Further, the actuator 300 may be used to align the optical coupling structure 215 in the slider 200 with respect to the fiber 410.

Figure 12:
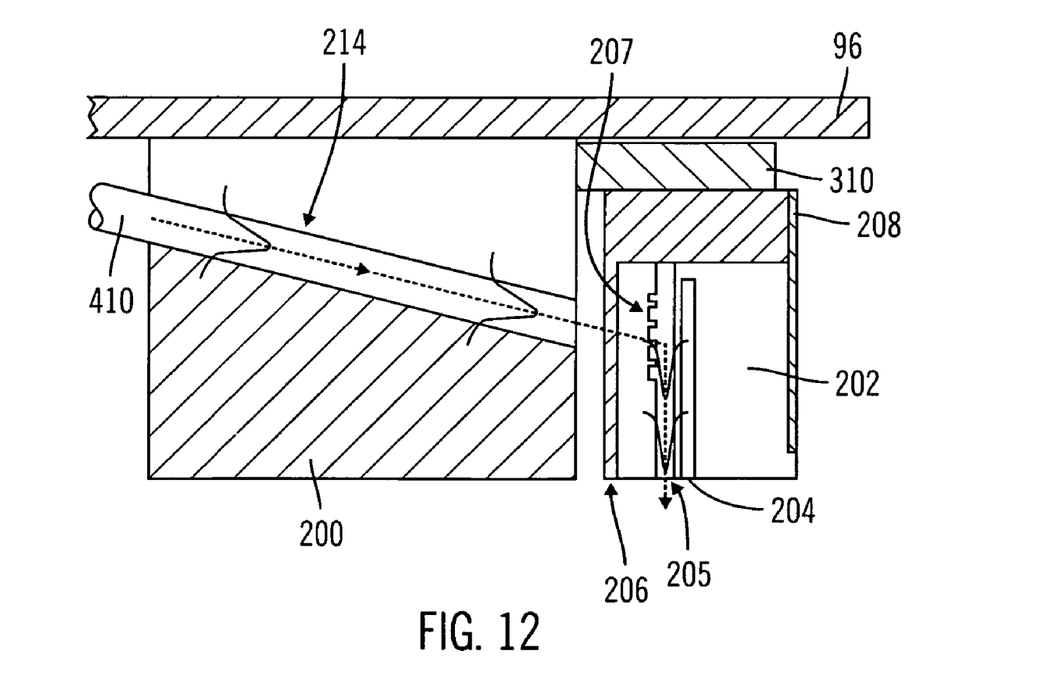
FIG. 12 is a schematic sectional view of a transducer comprising an actuator supporting the magnetic recording head in accordance with one embodiment of the present invention.

FIG. 12 is a schematic sectional view illustrating the embodiment in which the transducer assembly includes an actuator 310 that supports the magnetic recording head 202 for motion relative to the flexure 96. Comparing to the embodiment shown in FIG. 5, the difference in FIG. 12 is the free support of the magnetic recording head 202 with respect to the slider 200 using the actuator 310. The slider 200, magnetic recording head 202 and the actuator 300 may be fabricated as an integrated component (e.g., on a single substrate), or as separate components that are assembled together. In this embodiment, the fiber 410 is held in the slider 200. The actuator 310 may be of the type that provides vertical motions as well as lateral cross track motions (with respect to the magnetic recording medium, e.g., medium 40 shown in FIG. 3). It is noted that the range of micropositioning by the actuator 310 may have to be limited to within the alignment tolerance between the fiber 410 and the grating 207. Further, the actuator 310 may be used to microposition the magnetic recording head 202, to align it with respect to the fiber 410.

The actuators 300 and 310 may be MEMS actuator, piezo-transducers, or the like micropositioning actuators. Further examples of microactuators may be found in published literatures in this particular field.

While the invention has been particularly shown and described with reference to the preferred embodiments, it will be understood by those skilled in the art that various changes in form and detail may be made without departing from the spirit, scope, and teaching of the invention. For example, the magnetic recording head can include additional components to facilitate optical coupling. Furthermore, the present invention may be implemented in other types of data recording transducers (e.g., optical recording transducers, magneto-resistive transducers, etc.) and/or for use with other types of data recording media in other types of data recording systems (e.g., magnetic tape drive systems, magnetic disc drive systems, optical data recording systems, etc.), without departing from the scope and spirit of the present invention. Accordingly, the disclosed invention is to be considered merely as illustrative and limited in scope only as specified in the appended claims.

What is claimed is:

1. A transducer for use in conjunction with a magnetic data recording medium, comprising:
   a magnetic data recording head;
   a slider supporting the magnetic data recording head at a trailing end of the slider, wherein the trailing end of the slider is generally vertical with respect to the magnetic data recording medium, wherein the slider has a channel provided therein terminating towards a side of the magnetic data recording head facing the trailing end of the slider; and
   a transmission element supported in the channel and coupling input radiant energy from an external source to the magnetic data recording head, wherein the channel and the transmission element are angled relative to an edge of the slider that can be mounted to a flexure such that a read element and a write element of the magnetic data recording head are capable of reading and writing to a magnetic recording medium.

2. The transducer of claim 1, wherein the transmission element comprises at least one of a section of an optical fiber and an optical element.

3. The transducer of claim 2, wherein the optical element comprises a lens assembly.

4. The transducer of claim 3, wherein the optical element comprises a MEMS optical assembly.

5. The transducer of claim 1, wherein the channel comprises a closed channel in the form of a hole in the slider.

6. The transducer of claim 5, wherein the channel is keyed and the transmission element includes a portion that is complementarily keyed, to receive a complementary structure of the transmission element.

7. The transducer of claim 6, wherein the channel comprises a channel keyed having a rectangular cross section and the transmission element includes a portion that is complementarily keyed having a rectangular cross-section.

8. The transducer of claim 1, wherein the magnetic data recording head comprises a waveguide configured to couple input radiant energy from the transmission element to an output of the waveguide to the magnetic data recording medium.

9. The transducer of claim 8, wherein the magnetic data recording head further comprises a grating coupling the input radiant energy from the transmission element to the waveguide.

10. The transducer of claim 9, wherein the grating faces the end of the slider.

11. The transducer of claim 9, wherein the data recording head comprises a write element and a read element, wherein the wave guide and the grating are disposed between the read element and the write element such that the grating is functionally coupled to the waveguide, and wherein the grating couples the input radiant energy from the transmission element to the waveguide.

12. The transducer of claim 11, wherein the data recording head further comprises a transparent base disposed between the read element and the slider to facilitate light transmission from the transmission element to the grating.

13. The transducer of claim 12, wherein the grating and the waveguide are internal to the data recording head.

14. A transducer suspension assembly, comprising:
a suspension member;
a transducer as in claim 1, supported by the suspension member; and
a section of an optical fiber supported on the suspension member, coupling the input radiant energy to the transmission element.

15. A data storage system, comprising:
a magnetic data recording medium;
a radiant energy source;
a transducer suspension assembly as in claim 14; and
an actuator supporting and positioning the transducer with respect to the magnetic data recording medium to effect data recording.

16. The system of claim 15, wherein the transducer further comprises a magnetic data recording head to effect perpendicular magnetic data recording.

17. A method of magnetic data recording, comprising the steps of:
providing a radiant energy source;
providing a transducer suspension assembly as in claim 14;
directing radiant energy at a spot on the data recording medium; and
recording data at the spot where radiant energy has been directed.

18. The transducer of claim 1, wherein the slider is at least partially fabricated from a transparent material.

19. The transducer of claim 1, wherein the slider is entirely fabricated from a transparent material.

20. A method of fabricating a plurality of transducers, comprising the steps of:
providing a substrate;
forming an array of channels in the substrate, each channel associated with a transducer; and terminating at a surface of the substrate;
forming an array of magnetic data recording heads on the surface of the substrate, each magnetic recording head associated with a transducer, wherein each magnetic recording head covers an end of a corresponding channel, and wherein each channel terminates towards a corresponding magnetic data recording head;
providing a transmission element in each channel, which is structured to couple input radiant energy from an external source to the magnetic data recording head; wherein the channels and the transmission elements are not parallel to an edge of a respective transducer that can be mounted to a flexure such that a read element and a write element of the magnetic data recording head are capable of reading and writing to a magnetic recording medium; and
cutting the substrate and accompanying structures to separate the transducers.

* * * * *